Patented Apr. 17, 1923.

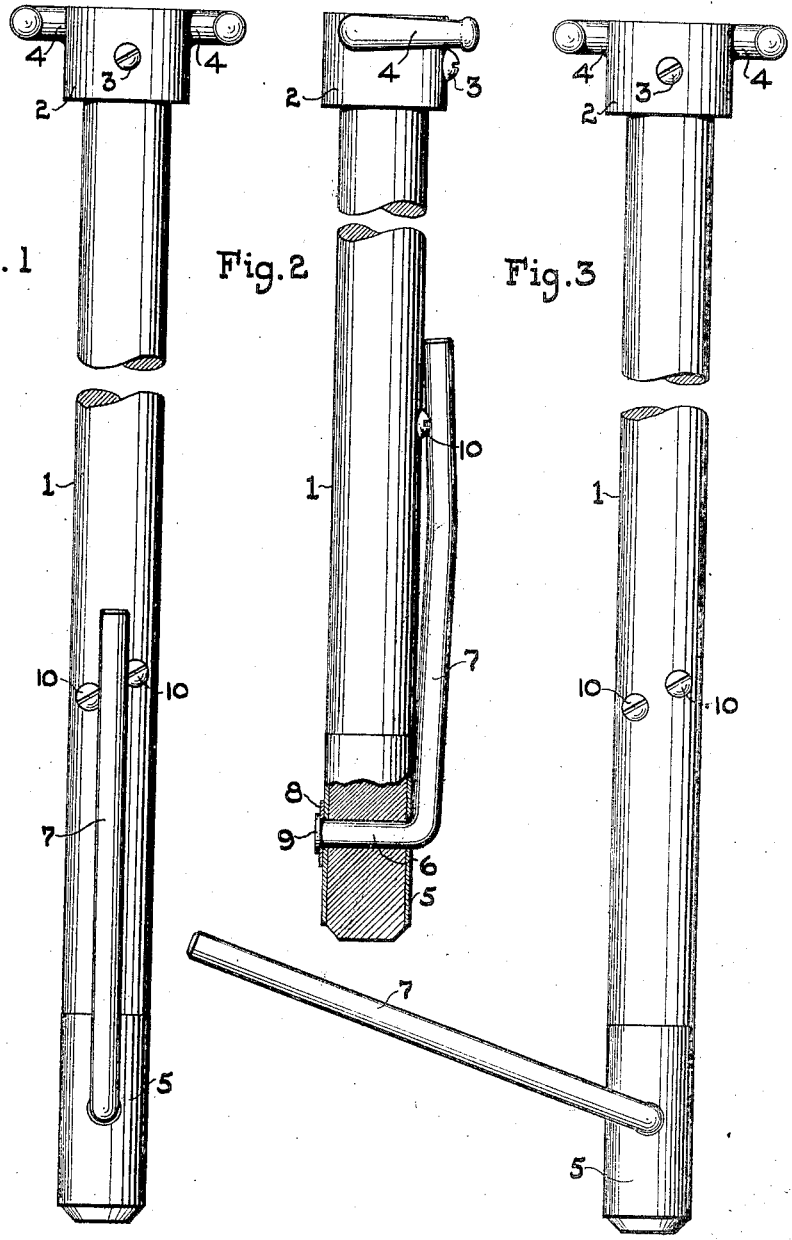

1,451,832

UNITED STATES PATENT OFFICE.

TOMLINSON FORT JOHNSON, JR., OF ATLANTA, GEORGIA.

MANIPULATING STICK FOR CLAMPS, SWITCHES, ETC., IN ELECTRIC DISTRIBUTING SYSTEMS.

Application filed July 6, 1921. Serial No. 482,751.

*To all whom it may concern:*

Be it known that I, TOMLINSON F. JOHNSON, Jr., a citizen of the United States, residing at Atlanta, in the county of Fulton and State of Georgia, have invented a new and useful Manipulating Stick for Clamps, Switches, Etc., in Electric Distributing Systems, of which the following is a specification.

This invention has reference to manipulating sticks for operating clamps, switches and other electric devices in electric distributing systems, and its object is to provide a manipulating stick permitting the handling of various apparatus in live circuits where the voltage is high, whereby to protect workmen from shocks which may prove dangerous, and even fatal, especially where the voltage ranges from, say, 30,000 volts to 120,000 volts, or more.

In accordance with the invention the stick, of which the body may be conveniently made of wood, is from three feet long to ten or twelve feet long and of appropriate diameter, and is provided with a swivel crank handle movable from a temporarily locked position parallel with the stick, to another position perpendicular to the stick, so that the crank handle may be utilized as a lever whereby a twisting motion may be imparted to the stick, to operate clamps or other devices, for which the stick is adapted.

The invention will be best understood from a consideration of the following detailed description, taken in connection with the accompanying drawings, forming a part of this specification, with the understanding, however, that the invention is not confined to any strict conformity to the showing of the drawing, but may be changed and modified, so long as such changes and modifications mark no material departure from the salient features of the invention, as expressed in the appended claims.

In the drawings:—

Fig. 1 is an elevation of the stick with the manipulating crank handle or lever in the inoperative position;

Fig. 2 is an elevation at right angles to the showing of Fig. 1, and also showing a portion of the stick in section;

Fig. 3 is a view similar to Fig. 1, but showing the crank handle or lever in the operative position.

In the drawing, there is shown a stick 1 of elongated form, usually from three feet to eight or ten feet in length, and which may be constructed of wood of suitable dimensions, because of its lightness, cheapness and insulating qualities.

At one end the stick carries a sleeve 2 fitting the stick tightly and held against turning thereon by a screw 3, or other appropriate means. The sleeve 2 is provided on diametrically opposite sides with angle fingers or horns 4, pointed in the same direction, lateral to the longitudinal axis of the stick, so that either of the fingers or horns may be engaged in a clamp, or other device, and the clamp may be operated by a twisting action of the stick or, the clamp may be lifted, after being engaged by one or both of the fingers 4, to an appropriate height. The stick, in so far described, and for the purpose described, has been previously used and no claim is made thereto in this application.

At the other end of the stick from the head 2, the body of the stick is surrounded by a ferrule 5, and this ferrule, in addition to being forced tightly on the end of the stick, is traversed by an end portion 6 of a handle or lever 7, so bent that with the end 6 transverse of the ferrule end of the stick, the lever 7 may moved into substantially parallel relation with the stick, and has a slight trend toward the stick whereby, when the lever is in engagement with the stick, it bears against the stick with some force. The transverse portion 6 fits the bore of the ferrule snugly so that a stiff joint is provided.

The extremity of the end 6, after it has been passed through the ferrule 5 and through a washer 8, is upset to form a head 9. In practice, the lever 7 may be conveniently about seven or eight inches long, and located on the stick in position to be engaged by the lever adjacent to its free end, are stops 10, sufficiently spaced to lodge the lever between them, and, because of the tendency of the lever toward the stick and the slight elasticity of the lever, the latter may be snapped over one of the stops to a position between the two stops, to be there held temporarily from displacement, although capable of being forced about the end 6, which constitutes a pivot, into a position similar to the showing of Fig. 3, where the lever serves as a handle permitting the stick to be rotated about its longitudinal axis.

In operating with the stick of the invention, a clamp, which is not herein shown, but appears in another application for Letters-Patent, executed of even date herewith, is engaged by one of the fingers or horns 4, after which the stick can be rotated about its longitudinal axis, in a left hand direction, if necessary, allowing the jaws of the clamp to open sufficiently to receive a line conductor. The stick is then revolved about its longitudinal axis in the other, or right hand direction, bringing the jaws of the clamp together with considerable pressure. By simply twisting the stick by hand, it would be a difficult matter to draw the clamp up sufficiently to provide enough pressure between the jaws. Under these circumstances, the lever 7 is brought into approximately right angular relation to the stick and greater pressure may be exerted on the stick and the clamp carried thereby.

By the means described, the clamp can be drawn up tightly enough to exert approximately a thousand pounds pressure.

What is claimed is:—

1. A manipulating means for handling electrical devices, comprising a stick, means at one end thereof for engaging such devices, such stick having a transverse bore at the other end, a rod having one end bent at an angle, said bent end being permanently and snugly held in the bore of said stick and having a stiff pivotal connection therewith, whereby the rod is permitted only a turning movement on said bent end from a position at an angle to the stick to a position in parallelism therewith.

2. A stick for handling electrical devices having means at one end for engaging such devices, said stick having a transverse bore at the other end, a rod having one end bent at an angle, said bent end being inserted and fitting snugly in said bore and permanently held therein and providing a stiff pivotal connection therewith, said rod being resilient and having a normal tendency toward the stick at its free end, and spaced stops on the stick, whereby when the rod is brought into parallelism with the stick, it may be snapped over one of the stops to a position between the stops and held from displacement.

3. A means for handling electrical devices, comprising a stick having means at one end for engaging such devices, a ferrule at the other end provided with a transverse bore which extends through the stick, a rod having one end bent transversely, said end being inserted through and held permanently in the bore of the ferrule and stick and fitting said bore snugly so that a stiff pivotal joint is provided for the bent end of the rod, said rod being resilient and having a normal tendency toward said stick at its free end whereby the rod is permitted to turn only on said bent end either at an angle to said stick or in parallelism therewith.

4. A manipulating means for electrical devices, comprising a stick, of elongated form and a sleeve or head thereon with angular fingers or horns projecting from opposite sides of the head, and angularly bent rod traversing the other end of the stick and related to the stick to constitute a manipulating lever or handle, whereby the lever may be held to the stick in substantial parallelism therewith, or moved toward right-angle relation to the length of the stick for moving the latter about its longitudinal axis, and approximated stops on the stick between which the lever may be temporarily lodged and held.

In testimony, that I claim the foregoing as my own, I have hereto affixed my signature.

TOMLINSON FORT JOHNSON, Jr.